United States Patent
Yi et al.

(10) Patent No.: US 9,175,616 B2
(45) Date of Patent: Nov. 3, 2015

(54) APPROACH FOR CONTROLLING EXHAUST GAS RECIRCULATION

(71) Applicant: Ford Global Technologies, LLC, Dearborn, MI (US)

(72) Inventors: Jianwen James Yi, Canton, MI (US); Steven Wooldridge, Saline, MI (US); Brad Alan VanDerWege, Plymouth, MI (US); Shiyou Yang, Ann Arbor, MI (US); Thomas A. McCarthy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 431 days.

(21) Appl. No.: 13/648,563

(22) Filed: Oct. 10, 2012

(65) Prior Publication Data

US 2014/0100760 A1    Apr. 10, 2014

(51) Int. Cl.
| | |
|---|---|
| *F02M 25/07* | (2006.01) |
| *F02D 21/08* | (2006.01) |
| *F02D 13/02* | (2006.01) |
| *F02D 41/00* | (2006.01) |
| *F02D 41/30* | (2006.01) |
| *F02D 43/00* | (2006.01) |
| *F02B 75/12* | (2006.01) |

(52) U.S. Cl.
CPC ............ *F02D 21/08* (2013.01); *F02D 13/0207* (2013.01); *F02D 13/0219* (2013.01); *F02D 41/0057* (2013.01); *F02D 41/3011* (2013.01); *F02B 2075/125* (2013.01); *F02D 13/0265* (2013.01); *F02D 43/00* (2013.01); *Y02T 10/123* (2013.01); *Y02T 10/18* (2013.01); *Y02T 10/47* (2013.01)

(58) Field of Classification Search
CPC ............ F02D 2041/001; F02D 41/402; F02D 41/006; F02D 41/401; F02D 13/0265; Y02T 10/44; Y02T 10/123; F02M 25/0752; F02M 25/0754
USPC ............. 123/568.11, 568.14, 568.21, 568.22, 123/568.31, 299, 300; 701/102–105, 108
See application file for complete search history.

(56) References Cited

U.S. PATENT DOCUMENTS

| | | | |
|---|---|---|---|
| 4,149,500 A * | 4/1979 | Aoyama ........................ 123/676 |
| 4,245,607 A * | 1/1981 | Aoyama ................... 123/568.29 |
| 6,321,531 B1 | 11/2001 | Caren et al. |
| 2008/0178836 A1* | 7/2008 | Yamashita et al. ............ 123/295 |
| 2009/0093946 A1* | 4/2009 | Yamashita et al. ............ 701/103 |
| 2010/0023241 A1* | 1/2010 | Guo et al. ...................... 701/103 |
| 2010/0205941 A1* | 8/2010 | Okada et al. .................... 60/277 |
| 2010/0236517 A1* | 9/2010 | Hatamura et al. ............. 123/299 |
| 2010/0242899 A1 | 9/2010 | Hitomi et al. |
| 2010/0242900 A1* | 9/2010 | Hitomi et al. ................. 123/299 |
| 2011/0067679 A1 | 3/2011 | Hitomi et al. |

(Continued)

Primary Examiner — Thomas Moulis
Assistant Examiner — Joseph Dallo
(74) Attorney, Agent, or Firm — Julia Voutyras; Alleman Hall McCoy Russell & Tuttle LLP

(57) ABSTRACT

Various embodiments related to controlling EGR in an engine are disclosed. In one embodiment, a first EGR amount is supplied to a cylinder at a first temperature and a first engine speed and load. Further, at the first engine speed and load, as engine temperature increases from the first temperature to a second temperature, a first fuel amount is injected after exhaust valve closing and before intake valve opening while a second EGR amount is supplied to the cylinder that is greater than the first EGR amount.

22 Claims, 6 Drawing Sheets

(56) References Cited

U.S. PATENT DOCUMENTS

| | | | |
|---|---|---|---|
| 2011/0144892 A1* | 6/2011 | Katsumata | 701/104 |
| 2011/0153179 A1* | 6/2011 | Guglielmone et al. | 701/102 |
| 2011/0155109 A1* | 6/2011 | Onishi et al. | 123/568.11 |
| 2011/0231081 A1* | 9/2011 | Suzuki et al. | 701/104 |

\* cited by examiner

APPROACH FOR CONTROLLING EXHAUST GAS RECIRCULATION

BACKGROUND AND SUMMARY

Engines may be configured with exhaust gas recirculation (EGR) systems to divert at least some exhaust gas from an engine exhaust passage to an engine intake passage. By controlling EGR to provide a desired engine dilution, engine pumping work, engine knock, as well as NOx emissions may be reduced. For example, at partial throttle operating conditions, providing EGR to the cylinders of the engine allows for the throttle to be opened to a greater extent for the same engine load. By reducing throttling of the engine, pumping losses may be reduced, thus improving fuel efficiency. Further, by providing EGR to the engine, combustion temperatures may be reduced (especially in implementations where EGR is cooled prior to being provided to the cylinders). Cooler combustion temperatures provide engine knock resistance, and thus increase engine thermal efficiency. Further still, EGR reduces a combustion flame temperature that reduces an amount of NOx generated during combustion. In one example, during a combustion cycle, all EGR and fuel is provided to cylinders of an engine after intake valve opening.

However, the inventors herein have identified a potential issue with such an approach. For example, the amount of EGR provided to the engine cylinders may be limited by an engine dilution limit where combustion stability becomes degraded.

Thus in one example, some of the above issues may be at least partly addressed by a method comprising: at a first temperature and a first engine speed and load, supplying a first EGR amount to a cylinder; and at the first engine speed and load, as engine temperature increases from the first temperature to a second temperature, injecting a first fuel amount after exhaust valve closing and before intake valve opening and supplying a second EGR amount to the cylinder that is greater than the first EGR amount after intake valve opening.

By injecting an amount of fuel after exhaust valve closing and before intake valve opening, the fuel may interact with the hot/warm conditions in the cylinder. Such interaction causes at least some of the fuel to be converted into chemical radicals. Those chemical radicals then act as a catalyst to enhance combustion during compression and combustion strokes. In other words, the additional chemical radicals created by fuel injection after exhaust valve closing and before intake valve opening, lower engine dilution to facilitate stable combustion with an increased amount of EGR relative to an approach where fuel is merely injected after intake valve opening. The increased EGR concentration may lower the engine temperature to reduce emissions and increase efficiency and engine knock resistance.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
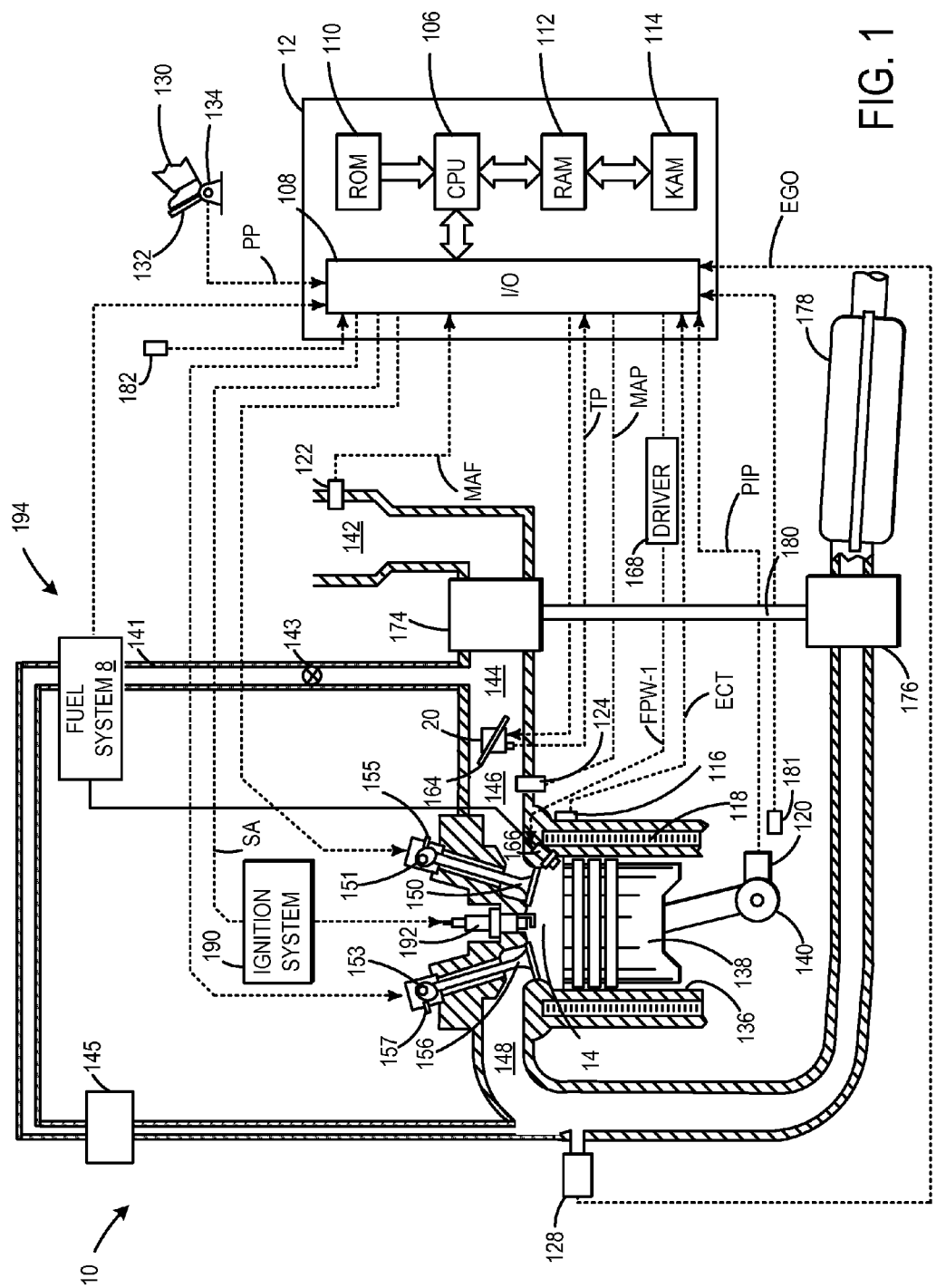
FIG. 1 shows an engine system according to an embodiment of the present disclosure.
Figure 2:
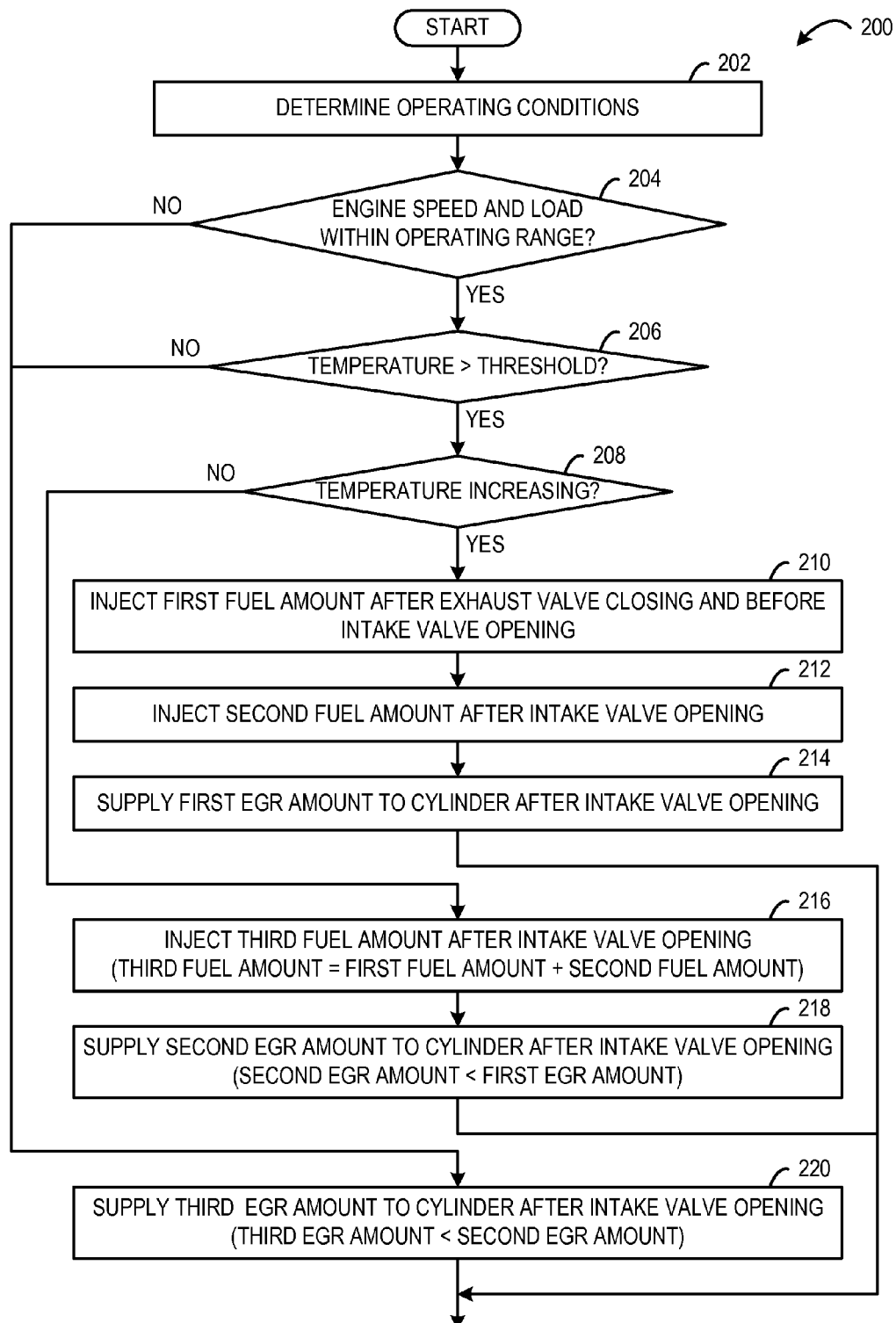
FIG. 2 shows a flow chart of a method for controlling fuel injection and EGR in an engine according to an embodiment of the present disclosure.
Figure 9:
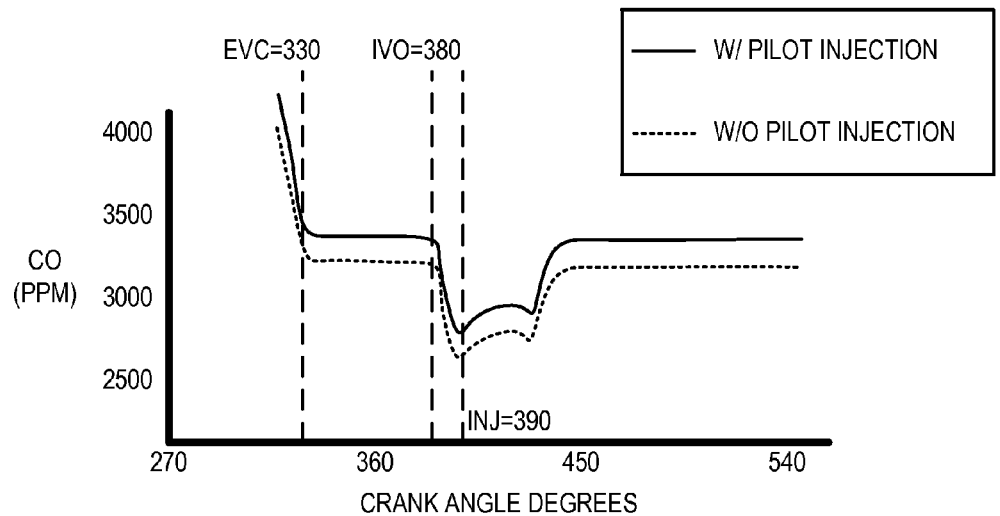
FIG. 9 shows a chart illustrating an example of carbon monoxide radicals produced as a result of different fuel injection events.
Figure 10:
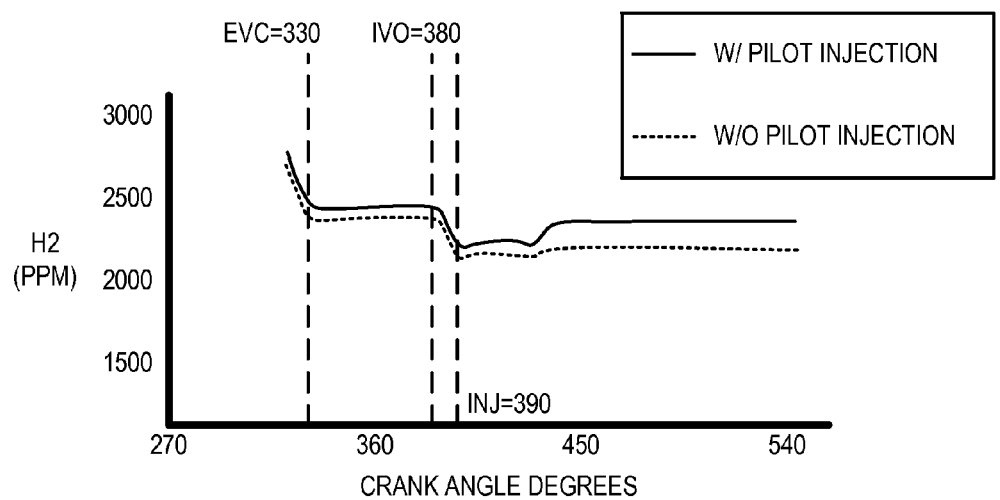
FIG. 10 shows a chart illustrating an example of di-hydrogen radicals produced as a result of different fuel injection events.

The present description is related to controlling an engine to operate with a higher EGR concentration while maintain combustion stability, under some conditions. In particular, the approach includes injecting a small amount of fuel near the time of exhaust valve closing and before intake valve opening in what may be referred to as negative valve overlap followed by injection a second larger amount for combustion. When the first injected fuel amount mixes with residual exhaust gas in the hot cylinder, at least some of the fuel is converted into chemical radicals that act as a catalyst for combustion during the following combustion cycle. In other words, the chemical radicals created by the initial injection during negative valve overlap facilitate stable combustion even as an EGR concentration in the cylinder is increased. In one example, this control approach may be applied to a direct-injection, spark-ignition engine including an EGR system as shown in FIG. 1. However, the present description may provide benefits for diesel and alternative fuel engines as well. Accordingly, this disclosure is not limited to a particular type of engine or a particular EGR system configuration. FIG. 2 shows a flow chart of a method for controlling an engine to operate with a higher EGR concentration while maintaining combustion stability. FIGS. 3-8 show simulated signals of interest when an engine and EGR system are operated according to the method of FIG. 2. FIGS. 9-10 show examples of levels of chemical radicals that are generated as a result of different fuel injection events.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a high pressure fuel system 8 including fuel tanks, fuel pumps, and a fuel rail. Alternatively, fuel may be delivered by a single stage fuel pump at lower pressure. Further, the fuel tanks may have a pressure transducer providing a signal to controller 12.

It will be appreciated that while in one embodiment, the engine may be operated by injecting fuel via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel delivered from the injector may vary with operating conditions, such as engine temperature, ambient temperature, etc., as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Engine 10 may further include an EGR system 194 including one or more exhaust gas recirculation passages for recirculating a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

It will be appreciated that while the embodiment of FIG. 1 shows low pressure (LP-EGR) being provided via an LP-EGR passage coupled between the engine intake upstream of the turbocharger compressor and the engine exhaust downstream of the turbine, in alternate embodiments, the engine may be configured to also provide high pressure EGR (HP-EGR) via an HP-EGR passage coupled between the engine intake downstream of the compressor and the engine exhaust upstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. For example, the ROM 110, RAM 112, or KAM 114, alone or in combination, may be representative of computer readable medium that is programmable to hold instructions that are executable by the processor 106 to control operation of engine 10. Controller 12 may receive various signals from sensors coupled to engine 10, in addition to those signals previously discussed, including measurement of inducted mass air flow (MAF) from mass air flow sensor 122; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Furthermore, controller 12 may receive signals that may be indicative of a various temperatures related to the engine 10. For example, engine coolant temperature (ECT) from temperature sensor 116 coupled to cooling sleeve 118 may be sent to controller 12. In some embodiments, sensor 128 may provide an indication of exhaust temperature to controller 12. Sensor 181 may provide an indication of oil temperature or oil viscosity to controller 12. Sensor 182 may provide an indication of ambient temperature to controller 12. One or more of these sensors may provide an indication of an engine temperature that may be used by controller 12 to control operation of the engine. For example, the engine temperature and/or the ambient temperature may be used to control fuel injector 166 in conjunction with EGR valve 143 to provide increased EGR while maintaining stable combustion, under some conditions, as will be discussed in further detail below.

In one example, controller 12 includes a processor and computer-readable medium having instructions that when executed by the processor: supply a first EGR amount to the cylinder 14 via the EGR system 194 at a first engine temperature and a first engine speed and load. Further, at the first engine speed and load, as engine temperature increases from the first engine temperature to a second engine temperature, inject a first fuel amount after exhaust valve closing and before intake valve opening via the fuel injector 166 while supplying a second EGR amount to the cylinder that is greater than the first EGR amount after intake valve opening via the EGR system 194.

By injecting the first fuel amount during negative valve overlap, the fuel may be heated in the cylinder, and converted to chemical radicals that act as a catalyst for combustion. The additional chemical radicals lower the dilution level in the cylinder which allows for the additional EGR to be added without degrading combustion. In this way, fuel consumption may be decreased and engine efficiency and engine knock resistance may be increased.

In some embodiments, the computer readable medium of controller 12 further has instructions that when executed by the processor: at the first engine speed and load, as engine temperature increases from the first temperature to the second temperature, inject a second fuel amount that is greater than the first fuel amount after intake valve opening. In some cases, the first fuel amount that is injected after exhaust valve closing and before intake valve opening may be referred to as a pilot injection and the second fuel amount that is injected after intake valve opening may be referred to as the main injection. In one particular example, the first fuel amount is injected within twenty crank angle degrees after exhaust valve closing and the second fuel amount is injected within twenty crank angle degrees after intake valve opening. It will be appreciated that the timing of the main injection may vary based on operating conditions, such as engine speed and load.

In some embodiments, the computer readable medium of controller 12 further has instructions that when executed by the processor: inject substantially no fuel between injection of the first fuel amount and injection of the second fuel amount. By disabling fuel injector 166 in between the first fuel amount and the second fuel amount, the first fuel amount is allowed interact with the residual exhaust in the cylinder in order to suitably convert into chemical radicals that aid in stable combustion. It will be appreciated that the timing between injections may vary based on operating conditions, such as engine speed and load.

In some embodiments, the computer readable medium of controller 12 further has instructions that when executed by the processor: at the first temperature and the first engine speed and load, inject a third fuel amount that is substantially equal to a sum of the first fuel amount and the second amount after intake valve opening. For example, under some conditions where smaller amount of EGR is provided to the cylinder 14, the pilot injection may be dismissed in favor of a larger main injection that can accommodate stable combustion with that smaller amount of EGR.

In some embodiments, the computer readable medium of controller 12 further has instructions that when executed by the processor: at a second engine speed and load that is greater than the first engine speed and load, supply a third EGR amount to the cylinder that is less than the first EGR amount. For example, under higher engine speed and load conditions, such as at wide open throttle (e.g., accelerator tip-in), the EGR amount provided to the cylinder 14 may be reduced in favor of increasing engine output to meet the high engine load.

In some embodiments, the computer readable medium of controller 12 further has instructions that when executed by the processor: at a third temperature that is less than the first temperature, supply a third EGR amount to the cylinder that is less than the first EGR amount. For example, under some conditions, such as at low ambient temperature conditions, the EGR amount provided to the cylinder 14 may be reduced because the EGR may cool the cylinder to a degree that it affects engine operation. In one example, the third temperature is less than a temperature threshold that corresponds to catalyst light-off, and the third EGR amount is substantially zero. In other words, during cold engine conditions, the EGR valve 143 may be closed so substantially no EGR is provided to cylinder 14 via the EGR system 194. In this way, exhaust may be provided to emissions control device 178 to heat it to the catalyst light-off temperature more quickly.

In the above described embodiments, fuel injection and EGR are controlled differently as temperature varies for a given engine speed and load in order to provide additional EGR when suitable while maintaining stable combustion. In particular, at lower temperatures, a lower EGR amount may be provided to the cylinders after intake valve opening while a single main fuel injection is performed. The main injection may provide a suitable amount of chemical radicals to stable combust the lower EGR amount. Furthermore, at higher temperatures, a higher EGR amount may be provided and fuel injection may be split into a pilot injection performed during negative valve overlap and a main injection performed after intake valve opening while the higher EGR amount is provided to the cylinders. The pilot injection increase the amount of chemical radicals in the cylinder which lowers the dilution level in the cylinders that allows for the higher EGR amount to be stably combusted.

The above described embodiments control fuel injection and EGR for a given engine speed and load. It should be appreciated that this is merely one example of a give condition at which fuel injection and EGR may be controlled as temperature varies. In another embodiment, controller 12 includes a processor and computer-readable medium having instructions that when executed by the processor: for a given condition at a lower temperature, operate with a lower EGR amount and a single direct fuel injection commencing after intake valve opening during an intake stroke. Furthermore, for the given condition at a higher temperature, operate with a higher EGR amount, a first direct fuel injection commencing after exhaust valve closure but before intake valve opening, and a second direct fuel injection commencing after the intake valve opening.

In some embodiments, the computer readable medium of controller 12 further has instructions that when executed by the processor: combust the first and second injections as a mixture in an engine cylinder. In some embodiments, the lower EGR amount is greater than zero. In some embodiments, the second direct fuel injection is only during the intake stroke. In some embodiments, the single direct fuel injection is only during negative valve overlap between intake and exhaust valve opening. In some embodiments, the first and second injections comprise all injections for a combustion cycle in which they combust. In some embodiments, for the given condition at the lower temperature, no direct injections to the cylinder occur during negative valve overlap between intake and exhaust valve opening.

Note that EGR and fuel injection may be controlled based on combustion stability limits beyond which there may be an increased likelihood of degraded combustion including partial burns, misfires, increased exhaust emissions, and/or reduced torque output from the cylinder.

In this way, the system of FIG. 1 enables a method of operating an engine wherein a desired engine dilution is provided by combining a plurality of engine diluents, the diluents selected based on respective combustion stability limits.

FIG. 2 shows an example embodiment of a method 200 for controlling fuel injection and EGR under different operating conditions. In particular, under some operating conditions, fuel injection is adjusted to accommodate an increased EGR amount while maintaining combustion stability. In one example, the method 200 may be performed by controller 12 shown in FIG. 1. At 202, the method 200 may include determining operating conditions. Determining operating conditions may include receiving information from various components of engine 10. For example, controller 12 may receive operating state information of various valves including, in intake valve 150, exhaust valve 156, EGR valve 143, etc. Furthermore, determining operating condition may include monitoring various operating parameters of engine 10 or receiving signals from various sensors coupled to engine 10. The parameters monitored may include, for example, engine/cylinder temperature, ambient temperature, exhaust temperature, air/fuel ratio, engine dilution, engine load, engine speed, etc.

At 204, the method 200 may include determining whether an engine speed and load are within a designated operating range. In some embodiments, the designated operating range includes a part throttle operating range where EGR may be provided to increase engine efficiency. In some embodiments, the designated operating range may have an upper threshold where EGR may be reduced or not provided in favor of providing increased engine output to meet high engine load. In some embodiments, the designated operating range may have a lower threshold where EGR may be reduced or not provided, such as at engine idle. If it is determined that the engine speed and load are within the designated operating range, then the method 200 moves to 206. Otherwise, the method 200 moves to 218.

At 206, the method 200 may include determining whether an engine temperature is greater than an engine temperature threshold. In one example, the temperature threshold corresponds to a catalyst light-off temperature. Generally, this determination may be used to decide whether exhaust gas should be directed to emissions control device heating or exhaust gas recirculation. If it is determined that the engine temperature is greater than the temperature threshold, then the method 200 moves to 208. Otherwise, the method 200 moves to 220.

At 208, the method 200 may include determining whether the engine temperature is increasing. An increase in engine temperature may indicate an opportunity for a greater amount of EGR to be provided to the cylinders of the engine to reduce the likelihood of engine knock, and the like. If it is determined that the engine temperature is increasing, then the method 200 moves to 210. Otherwise, the method 200 moves to 216.

At 210, the method 200 may include injecting a first amount of fuel into cylinders of the engine after exhaust valve closing and before intake valve opening. In one example, the first fuel amount is injected within twenty crank angle degrees after exhaust valve closing. Note that the first amount of fuel may be injected close to exhaust valve closing in order to allow the fuel to be heated so that a suitable amount of fuel is converted into chemical radicals to enhance combustion.

At 212, the method 200 may include injecting a second amount of fuel into the cylinders after intake valve opening. The second amount of fuel may be greater than the first amount of fuel. In other words, the first injection may be a pilot injection of a relatively small amount of fuel to act as a catalyst for combustion and the second injection may be a main injection of a substantial amount of fuel for combustion. In one example, the second fuel amount is injected within twenty crank angle degrees after intake valve opening for the given engine speed and load. However, it will be appreciated that the timing of the second injection may vary as engine speed and load varies, in some cases.

In some embodiments, the method 200 may include injecting substantially no fuel between injection of the first fuel amount and injection of the second fuel amount. In other words, fuel injection is not continuous between the two injection events. No fuel may be injected between the two injection events in order to allow the fuel from the first injection event to heat and convert into chemical radicals that act as a catalyst to enhance combustion.

At 214, the method 200 may include supplying a first amount of EGR to the cylinders of the engine after intake valve opening. In one example, the first EGR amount may be supplied by actuating EGR valve 143 shown in FIG. 1. In some embodiments, the first EGR amount is provided to the cylinder while the second fuel amount is injected into the cylinders.

At 216, the method 200 may include injecting a third amount of fuel into the cylinders after intake valve opening. In some embodiments, the third amount is substantially equal to a sum of the first fuel amount and the second fuel amount. In other words, for a given engine speed and load, the amount of fuel injected over the course of a combustion cycle may not change, but the timing of when the fuel is injected may vary based on temperature and an amount of EGR supplied to the cylinders.

At 218, the method 200 may include supplying a second amount of EGR to the cylinder of the engine after intake valve opening. The second amount of EGR may be less than the first amount of EGR. The lesser amount of EGR may be provided to the cylinders because the temperature is not increasing, and thus less EGR may be needed for knock resistance, and the like. In some embodiments, the second amount of EGR may be supplied to the cylinders while the third amount of fuel is injected into the cylinders.

At 220, the method 200 may include supplying a third amount of EGR to the cylinders of the engine after intake valve opening. The third amount of EGR may be less than the second amount of EGR. In some embodiments, the third EGR amount is substantially zero. For example, during cold ambient conditions when the emissions control device is below a light-off temperature, EGR may be shut off in favor of directing exhaust gas through the emissions control device for heating purposes.

In some embodiments, the third amount of EGR may be provided to the cylinders at a second engine speed and load that is greater than the first engine speed and load. For example, at full throttle or high engine load conditions, the EGR amount may be reduced relative to part throttle conditions in order to increase engine output to meet the high engine load.

By injecting fuel after exhaust valve closing and before intake valve opening when temperature is increasing for a given engine speed and load, the fuel may be converted into chemical radicals. Those chemical radicals may then act as a catalyst to enhance main combustion during compression and combustion strokes. Such combustion enhancement may increase combustion stability and enable engine to operate at higher EGR concentration for higher fuel efficiency and lower emissions, while improving engine knock resistance.

In another embodiment, a method may include, for a given condition at a lower temperature, operating with a lower EGR amount and a single direct fuel injection commencing after intake valve opening during an intake stroke. The method further includes for the given condition at a higher temperature, operating with a higher EGR amount, a first direct fuel injection commencing after exhaust valve closure but before intake valve opening, and a second direct fuel injection commencing after the intake valve opening. In some embodiments, the given condition is a given engine speed and load. In some embodiments, the method further includes combusting the first and second injections as a mixture in an engine cylinder. In some embodiments, the lower EGR amount is greater than zero. In some embodiments, the second direct fuel injection is only during the intake stroke. In some embodiments, the single direct fuel injection is only during negative valve overlap between intake and exhaust valve opening. In some embodiments, the first and second injections comprise all injections for a combustion cycle in which they combust. In some embodiments, for the given condition at the lower temperature, no direct injections to the cylinder occur during negative valve overlap between intake and exhaust valve opening.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used. Moreover, the terms "first," "second," and "third," etc. are used merely as labels, and are not intended to impose numerical requirements or a particular positional order on their objects or elements.

Figure 3:
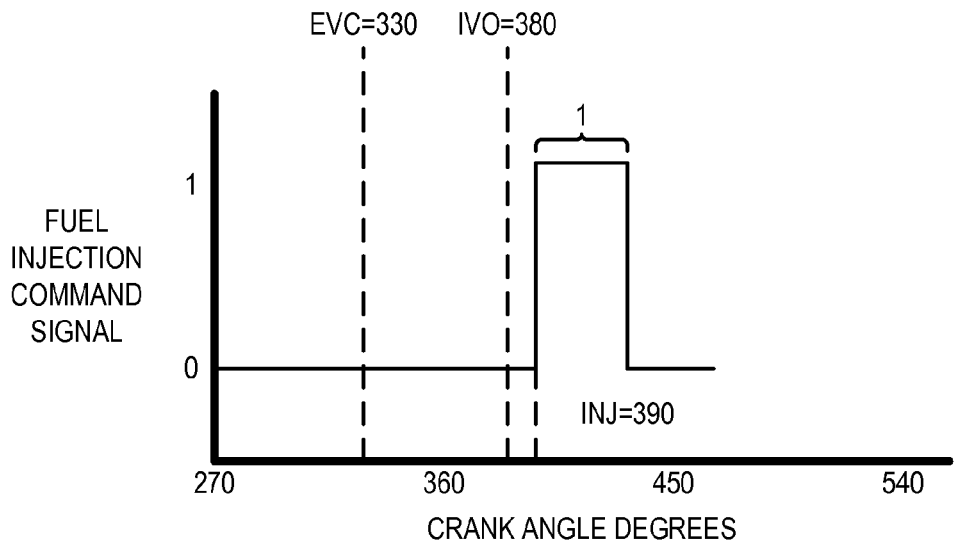
FIG. 3 shows a chart illustrating an example of controlling fuel injection at a first engine temperature.
Figure 4:
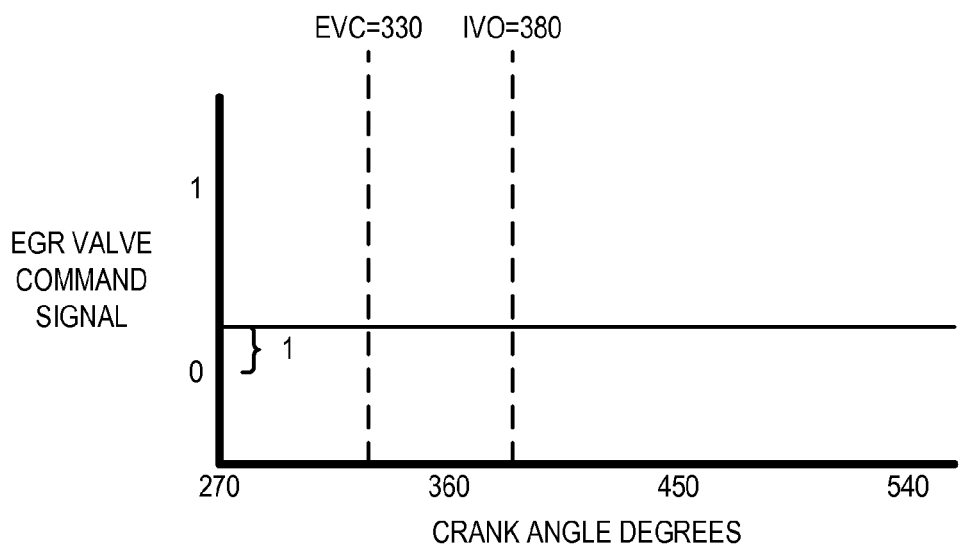
FIG. 4 shows a chart illustrating an example of controlling EGR at the first engine temperature.
Figure 5:
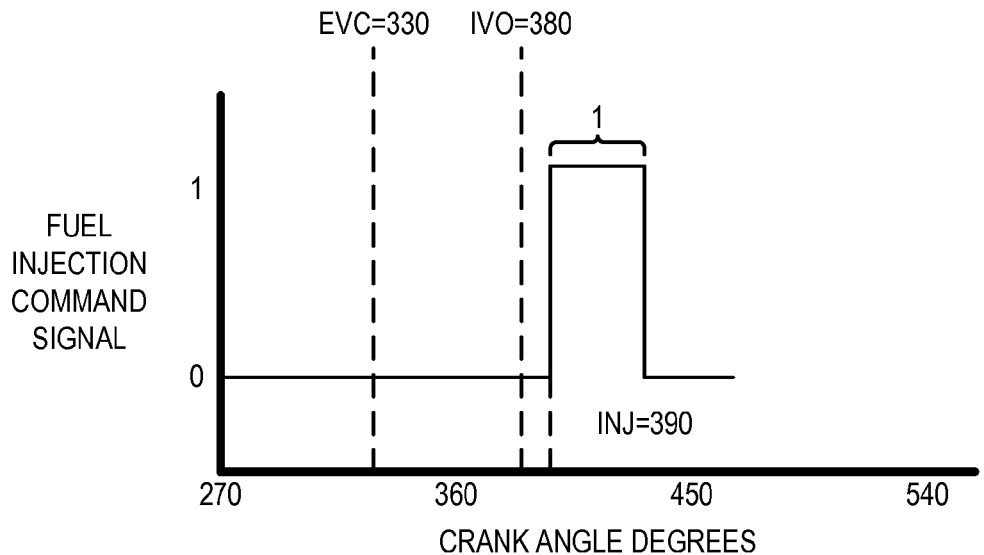
FIG. 5 shows a chart illustrating an example of controlling fuel injection at a second engine temperature that is greater than the first engine temperature.
Figure 6:
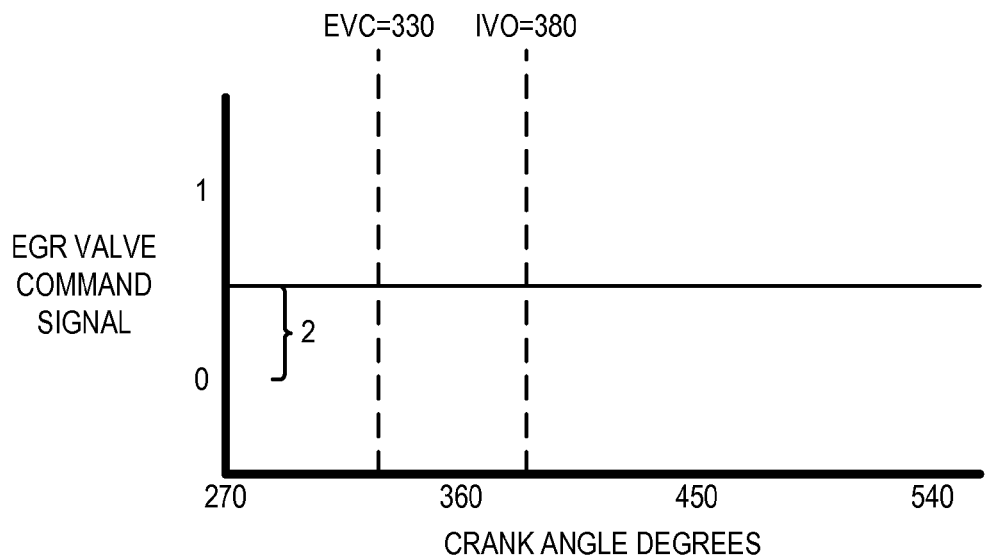
FIG. 6 shows a chart illustrating an example of controlling EGR at the second engine temperature.
Figure 7:
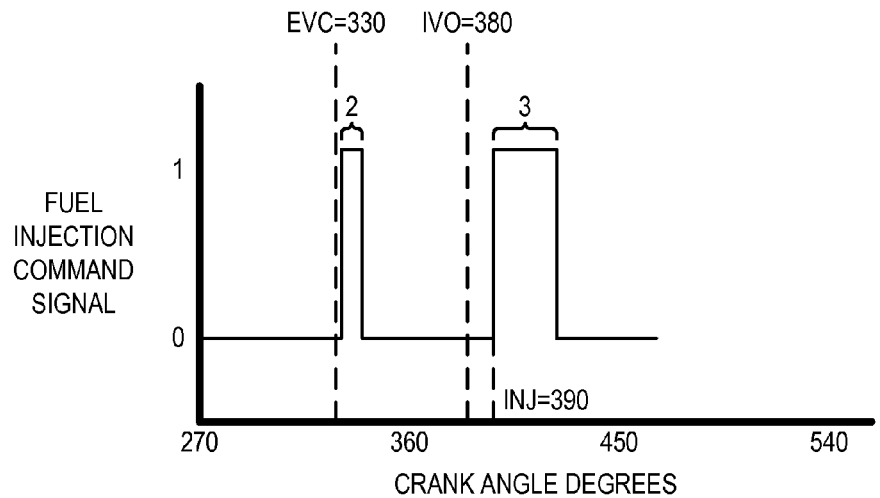
FIG. 7 shows a chart illustrating an example of controlling fuel injection at a third engine temperature that is greater than the second engine temperature.
Figure 8:
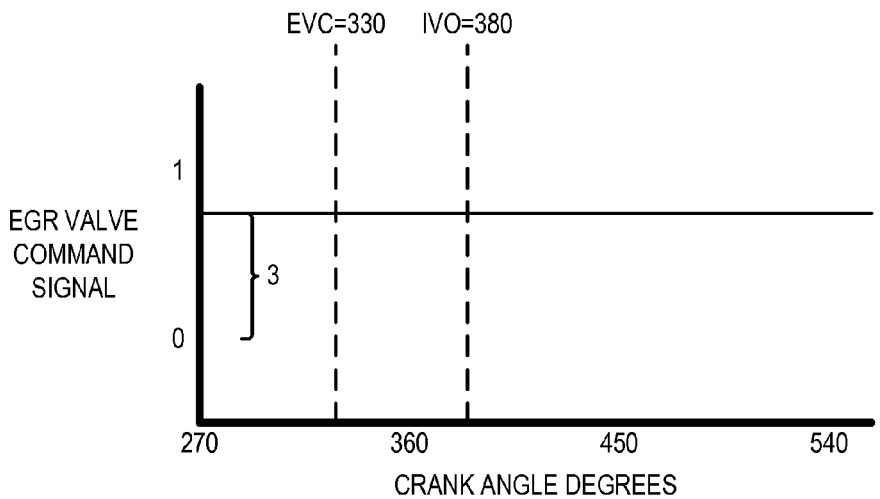
FIG. 8 shows a chart illustrating an example of controlling EGR at the third engine temperature.

FIGS. 3-8 show charts of simulated signals of interest when operating an EGR system according to the method 200 described above. Note that for all charts the operating conditions may include the same operation conditions, such as the same engine speed and load. FIGS. 3 and 4 show charts of fuel injection and EGR valve control signals plotted against crank angle degrees of a crankshaft over a combustion cycle at a first engine temperature. FIGS. 5 and 6 show charts of fuel injection and EGR valve control signals plotted against crank angle degrees of a crankshaft over a combustion cycle at a second engine temperature that is greater than the first engine temperature. FIGS. 7 and 8 show charts of fuel injection and EGR valve control signals plotted against crank angle degrees of a crankshaft over a combustion cycle at a third engine temperature that is greater than the second engine temperature.

FIG. 3 shows a control command signal for a fuel injector (e.g., fuel injector 166 of FIG. 1) at a first temperature. The X-axis represents crank angle degrees and crank angle degrees increases from the left to the right. The Y-axis represents the fuel injector command signal. The fuel injector is energized to inject fuel when the signal is at a higher level (e.g., 1) and de-energized so as not to inject fuel when at a lower level (e.g., 0). In particular, at this lowest of the three temperatures for the given conditions, a first fuel amount is injected after intake valve opening. In the illustrated example, the fuel amount is injected at 390 crank angle degrees. The first fuel amount may be a total fuel amount injected for the combustion cycle.

FIG. 4 shows a control command signal for an EGR valve (e.g., EGR valve 143 of FIG. 1) at a first temperature. The X-axis represents crank angle degrees and crank angle degrees increases from the left to the right. The Y-axis represents the EGR valve command signal. The EGR valve is energized to open and supply EGR to the cylinders when the signal is at a higher level (e.g., 1) and de-energized so as to close and not supply EGR to the cylinders at a lower level (e.g., 0). In particular, at this lowest of the three temperatures for the given conditions, a first EGR amount is supplied while the first amount of fuel is being injected to the cylinders. The first EGR amount may be smaller, or in some cases none, at lower temperatures because too much EGR may cool the cylinders more than desired. Moreover, exhaust may be diverted to emissions control devices for heating instead of for recirculation as EGR.

FIG. 5 shows a control command signal for a fuel injector (e.g., fuel injector 166 of FIG. 1) at a second temperature. The X-axis represents crank angle degrees and crank angle degrees increases from the left to the right. The Y-axis represents the fuel injector command signal. The fuel injector is energized to inject fuel when the signal is at a higher level (e.g., 1) and de-energized so as not to inject fuel when at a lower level (e.g., 0). In particular, at the second temperature which is greater than the first temperature for the given conditions, the first fuel amount is injected after intake valve opening. In other words, the same amount of fuel is injected at the same time for the first temperature and the second temperature.

FIG. 6 shows a control command signal for an EGR valve (e.g., EGR valve 143 of FIG. 1) at a second temperature. The X-axis represents crank angle degrees and crank angle degrees increases from the left to the right. The Y-axis represents the EGR valve command signal. The EGR valve is energized to open and supply EGR to the cylinders when the signal is at a higher level (e.g., 1) and de-energized so as to close and not supply EGR to the cylinders at a lower level (e.g., 0). In particular, at the second temperature for the given conditions, a second EGR amount is supplied after intake valve opening that is greater than the first EGR amount. For example, the amount of EGR supplied to the cylinders may be increased from the first EGR amount to the second EGR amount as temperature increases from the first temperature to the second temperature because the EGR lowers cylinder temperature and reduces the likelihood of engine knock. The EGR amount may be increased without increasing the fuel injection amount up to a dilution limit where combustion degrades. In the illustrated example, the second EGR amount is supplied to the cylinders while the first amount of fuel is being injected to the cylinders. Further, in the illustrated embodiment, the second EGR amount is twice as much as the first EGR amount, but the is merely one non-limiting example and any suitable increases in EGR may be supplied to the cylinders as temperature increases without departing from the scope of the present disclosure.

FIG. 7 shows a control command signal for a fuel injector (e.g., fuel injector 166 of FIG. 1) at a third temperature. The X-axis represents crank angle degrees and crank angle degrees increases from the left to the right. The Y-axis represents the fuel injector command signal. The fuel injector is energized to inject fuel when the signal is at a higher level (e.g., 1) and de-energized so as not to inject fuel when at a lower level (e.g., 0). In particular, at the third temperature which is greater than the first temperature and the second temperature for the given conditions, a second fuel amount is injected after exhaust valve closing and before intake valve opening. The second amount of fuel acts as a pilot injection that increases chemical radicals that reduces a dilution level in the cylinders in order to accommodate additional EGR while maintaining stable combustion. In the illustrated embodiment, the second fuel amount is injected slightly after exhaust valve closing (e.g., 333 crank angle degrees). The second fuel amount may be injected close to exhaust valve closing to allow for greater interaction of the fuel with the heated cylinders in order to facilitate the conversion of the fuel into chemical radicals.

Furthermore, a third fuel amount is injected after intake valve opening. The third fuel amount is a main injection to facilitate combustion during compression and ignition strokes of the combustion cycle. In the illustrated example, the third fuel amount is injected at 390 crank angle degrees. In some embodiments, the first fuel amount (shown in FIGS. 3 and 5) may be substantially equal to a sum of the second fuel amount and the third fuel amount. In other words, the amount of fuel injected at each of the different temperatures may not change. Rather, the timing at which portions of the total fuel amount are injected changes.

FIG. 8 shows a control command signal for an EGR valve (e.g., EGR valve 143 of FIG. 1) at a third temperature. The X-axis represents crank angle degrees and crank angle degrees increases from the left to the right. The Y-axis represents the EGR valve command signal. The EGR valve is energized to open and supply EGR to the cylinders when the signal is at a higher level (e.g., 1) and de-energized so as to close and not supply EGR to the cylinders at a lower level (e.g., 0). In particular, at the third temperature for the given conditions, a third EGR amount is supplied after intake valve opening that is greater than the first EGR amount and the second EGR amount. For example, the amount of EGR supplied to the cylinders may be increased from the second EGR amount to the third EGR amount as temperature increases from the second temperature to the third temperature because the EGR lowers cylinder temperature and reduces the likelihood of engine knock. The EGR amount may be increased from the second EGR amount to the third EGR amount without increasing the fuel injection amount by splitting the total fuel amount into the pilot injection and the main injection. The pilot injection increases the number of chemical radicals in the cylinders at the time of combustion which lowers the dilution level of the cylinder to accommodate additional EGR while maintaining stable combustion.

In the illustrated example, the third EGR amount is supplied while the third amount of fuel is being injected to the cylinders. Further, in the illustrated embodiment, the third EGR amount is a third more than the amount of the second EGR amount, but this is merely one non-limiting example and any suitable increase in EGR may be supplied to the cylinders as temperature increases without departing from the scope of the present disclosure.

Note in the above described examples the timing of the intake and exhaust valves is merely one non-limiting example and other opening and closing timings may be employed. Further, in some embodiments, the valve timing may change as temperature changes or as engine speed and load changes.

FIGS. 9 and 10 show charts illustrating an increase in chemical radicals as a result of performing a pilot injection after exhaust valve closing and before intake valve opening. Referring to FIG. 9, the X-axis of the chart represents crank angle degrees and crank angle degrees increases from the left to the right. The Y-axis represents carbon monoxide (CO) chemical radicals in parts-per-million (PPM) that resides in a cylinder of the engine. The level of CO particles generated as a result of the pilot injection performed after exhaust valve closing and before intake valve opening is represented by a solid line. The level of CO particles generated as a result of no pilot injection is represented by a dashed line. Referring to FIG. 10, the X-axis of the chart represents crank angle degrees and crank angle degrees increases from the left to the right. The Y-axis represents di-hydrogen (H2) chemical radical in parts-per-million (PPM) that resides in a cylinder of the engine. The level of H2 particles generated as a result of the pilot injection performed after exhaust valve closing and before intake valve opening is represented by a solid line. The level of H2 particles generated as a result of no pilot injection is represented by a dashed line.

From the beginning to exhaust valve closing (e.g., 330 crank angle degrees), since the exhaust valve is open, both of the levels of CO and H2 in the cylinder reduce during this period. From exhaust valve closing (e.g., 330 crank angle degrees) to intake valve opening (e.g., 380 crank angle degrees), since the cylinder is closed, both of the CO and H2 levels are nearly unchanged. After intake valve opening, as more air enters into the cylinder, the total in-cylinder mass is increased, and both CO and H2 may react with air and thus both CO and H2 in parts-per-million decrease before the main injection (e.g., 390 crank angle degrees). After a certain period of injection, the evaporated fuel vapor is heated by the cylinder wall, and the chemical kinetics process is accelerated to produce more CO and H2. In the case of the pilot injection, it is seen that more Co and H2 chemical radicals are produced than without the pilot injection. By producing more chemical radicals in the cylinder, the burn rate of next combustion cycle may be increased that allows for an amount of EGR to be increased while maintaining stable combustion.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method comprising:
   at a first temperature and a first engine speed and load, supplying a first EGR amount to a cylinder; and
   at the first engine speed and load, responsive to engine temperature increasing to a second temperature, injecting a first fuel amount after exhaust valve closing and before intake valve opening and supplying a second EGR amount to the cylinder greater than the first EGR amount after intake valve opening.

2. The method of claim 1, further comprising:
   at the first engine speed and load, responsive to engine temperature increasing from the first temperature to the second temperature, injecting a second fuel amount that is greater than the first fuel amount after intake valve opening.

3. The method of claim 2, wherein the first fuel amount is injected within twenty crank angle degrees after exhaust valve closing and the second fuel amount is injected within twenty crank angle degrees after intake valve opening, and wherein supplying the first EGR amount comprises supplying the first EGR amount to the cylinder after intake valve opening.

4. The method of claim 2, further comprising:
   injecting substantially no fuel between injection of the first fuel amount and injection of the second fuel amount, and wherein the first fuel amount and second fuel amount comprise a total fuel amount injected for a combustion cycle.

5. The method of claim 2, further comprising:
   at the first temperature and the first engine speed and load, injecting a third fuel amount that is substantially equal to a sum of the first fuel amount and the second fuel amount after intake valve opening.

6. The method of claim 1, further comprising:
   at a second engine speed and load that is greater than the first engine speed and load, supplying a third EGR amount to the cylinder that is less than the first EGR amount, and wherein the first EGR amount, second EGR amount, and third EGR amount are supplied to the cylinder from an exhaust passage to an intake passage via an EGR passage.

7. The method of claim 1, further comprising:
   at a third temperature that is less than the first temperature, supplying a third EGR amount to the cylinder that is less than the first EGR amount.

8. The method of claim 7, wherein the third temperature is less than a temperature threshold that corresponds to a catalyst light-off temperature and the third EGR amount is substantially zero.

9. An engine system comprising:
   a cylinder coupled to an engine intake and an engine exhaust;
   a fuel injector configured to directly inject fuel into the cylinder;
   an EGR system for recirculating an amount of exhaust gas from the engine exhaust to the engine intake; and
   a controller including a processor and computer readable medium holding instruction that when executed by the processor:
      at a first engine temperature and a first engine speed and load, supply a first EGR amount after intake valve opening to the cylinder via the EGR system; and
      at the first engine speed and load, responsive to engine temperature increasing from the first engine temperature to a second engine temperature, inject a first fuel amount after exhaust valve closing and before intake valve opening via the fuel injector while supplying a second EGR amount to the cylinder that is greater than the first EGR amount after intake valve opening via the EGR system.

10. The engine system of claim 9, wherein the computer readable medium further has instructions that when executed by the processor:
    at the first engine speed and load, responsive to engine temperature increasing from the first temperature to the second temperature, inject a second fuel amount that is greater than the first fuel amount after intake valve opening, and wherein the fuel injector is the only fuel injector coupled to the cylinder.

11. The engine system of claim 10, wherein the first fuel amount is injected within twenty crank angle degrees after exhaust valve closing and the second fuel amount is injected within twenty crank angle degrees after intake valve opening.

12. The engine system of claim 10, wherein the computer readable medium further has instructions that when executed by the processor:
    inject substantially no fuel between injection of the first fuel amount and injection of the second fuel amount.

13. The engine system of claim 10, wherein the computer readable medium further has instructions that when executed by the processor:
    at the first engine temperature and the first engine speed and load, inject a third fuel amount that is substantially equal to a sum of the first fuel amount and the second fuel amount after intake valve opening.

14. The engine system of claim 9, wherein the computer readable medium further has instructions that when executed by the processor:
at a second engine speed and load that is greater than the first engine speed and load, supply a third EGR amount to the cylinder that is less than the first EGR amount.

15. The engine system of claim 9, wherein the computer readable medium further has instructions that when executed by the processor:
at a third engine temperature that is less than the first engine temperature, supply a third EGR amount to the cylinder that is less than the first EGR amount.

16. The engine system of claim 15, wherein the third engine temperature is less than a temperature threshold that corresponds to a catalyst light-off temperature and the third EGR amount is substantially zero.

17. A method comprising:
at a first engine temperature, injecting a first fuel amount to a cylinder after intake valve opening while supplying a first EGR amount to the cylinder; and
at a second engine temperature that is greater than the first engine temperature, injecting a second fuel amount to the cylinder after exhaust valve closing and before intake valve opening, and injecting a third fuel amount to the cylinder after intake valve opening while supplying a second EGR amount to the cylinder that is greater than the first EGR amount, the first EGR amount and second EGR amount supplied to the cylinder from an exhaust passage to an intake passage via an EGR passage.

18. The method of claim 17, further comprising:
injecting substantially no fuel between injection of the second fuel amount and injection of the third fuel amount.

19. The method of claim 17, wherein the first fuel amount is substantially equal to a sum of the second fuel amount and the third fuel amount.

20. The method of claim 17, further comprising:
at a third engine temperature that is less than the first engine temperature, supplying a third EGR amount to the cylinder that is less than the first EGR amount.

21. A method, comprising:
for a given condition at a lower temperature, operating with a lower EGR amount and a single direct fuel injection commencing after intake valve opening during an intake stroke; and
for the given condition at a higher temperature, operating with a higher EGR amount, a first direct fuel injection commencing after exhaust valve closure but before intake valve opening, and a second direct fuel injection commencing after the intake valve opening, where the given condition is a given engine speed and load and where the lower EGR amount and higher EGR amount are supplied from an exhaust passage to an intake passage via an EGR passage.

22. The method of claim 21, further comprising combusting the first and second direct fuel injections as a mixture in an engine cylinder, wherein the lower EGR amount is greater than zero, wherein the second direct fuel injection is only during the intake stroke, and wherein the single direct fuel injection is only during negative valve overlap between intake and exhaust valve opening, wherein the first and second direct fuel injections comprise all injections for a combustion cycle in which they combust, and wherein for the given condition at the lower temperature, no direct injections to the cylinder occur during negative valve overlap between intake and exhaust valve opening.

* * * * *